United States Patent [19]

Iida

[11] Patent Number: 5,186,682
[45] Date of Patent: Feb. 16, 1993

[54] AIR CONDITIONING SYSTEM FOR VEHICLES

[75] Inventor: Katsumi Iida, Ohsato, Japan

[73] Assignee: Zexel Corporation, Tokyo, Japan

[21] Appl. No.: 770,356

[22] Filed: Oct. 3, 1991

[30] Foreign Application Priority Data

Oct. 9, 1990 [JP] Japan ................................ 2-271426

[51] Int. Cl.⁵ .............................................. B60H 3/00
[52] U.S. Cl. ........................................ 454/75; 165/43; 236/91 C
[58] Field of Search ............... 454/75, 155; 236/91 C, 236/49.3; 165/43

[56] References Cited

U.S. PATENT DOCUMENTS 4,978,061 12/1990 Ogihara et al. .................... 236/91 C

FOREIGN PATENT DOCUMENTS

0107913 7/1982 Japan ................................. 236/91 C
1-190520 7/1989 Japan .

Primary Examiner—William E. Wayner
Attorney, Agent, or Firm—Pollock, Vande Sande & Priddy

[57] ABSTRACT

In a vehicular air conditioning system, an air-distribution ratio control range is determined in accordance with a set rotational speed of a blower and the air distribution ratio is controlled in accordance with a solar radiation direction within the control range, whereby more comfortable air conditioning can be realized. The system may be arranged in such a way that the correction amount of air discharge in the case where the direction of the solar radiation is not within the a prescribed range is less than that in the case where the direction is within the perscribed range, in order to prevent unnecessarily large amount of air discharge.

13 Claims, 8 Drawing Sheets

AIR CONDITIONING SYSTEM FOR VEHICLES

BACKGROUND OF THE INVENTION

1. Field of the Invention

The present invention relates to an air conditioning system for vehicles capable of controlling the air-distribution in accordance with the direction of the sun.

2. Description of the Prior Art

There have been proposed various air conditioning systems for vehicles of the type in which the ratio between the amounts of air discharged to the left and right sides of the passenger compartment (hereinafter referred to as the air-distribution ratio) is changed depending upon the amount of solar radiation striking the left and right sides of the passenger compartment, for keeping the passenger compartment in a properly air-conditioned state.

Japanese Patent Application Public Disclosure No. Hei 1-190520, for example, discloses an air conditioning system for vehicles, in which an air-distribution door for regulating the air-distribution ratio is controlled in response to an output signal generated by a solar radiation detector and at least a certain lower limit amount of air is supplied to each side of the passenger compartment by the air-distribution control operation irrespective of the direction of the sun relative to the traveling direction of the vehicle.

In this conventional system in which the air-distribution ratio is controlled in response to the direction of the sun, the air-distribution door is controlled so as to supply a greater amount of air to the side of the passenger compartment receiving more solar radiation than to the other side. Although this arrangement can eliminate imbalances in heat quantity within the passenger compartment, it does not give adequate consideration to controlling such factors as the flow pattern and flow volume of the air blowing on the occupants so as to increase their comfort.

SUMMARY OF THE INVENTION

It is an object of the present invention to provide an improved air conditioning system for vehicles which is capable of directing appropriate amounts of air toward the occupant(s) in the case where the air-distribution ratio is controlled in response to the direction of the sun.

It is another object of the present invention to provide an air conditioning system for vehicles, in which the air-distribution ratio control range is adjusted in relation to the amount of air discharge.

It is a further object of the present invention to provide an air conditioning system for vehicles which is capable of avoiding excessive air discharge during the air-distribution ratio controlling operation.

According to the present invention, in a vehicular air conditioning system in which an air flow produced by a blower is conditioned and discharged into a passenger compartment, the system comprises a regulating member for regulating the air-distribution ratio, a plurality of solar radiation quantity detectors for detecting the quantities of solar radiation at a plurality of points in the passenger compartment, a calculating means responsive to the solar radiation quantity detectors for calculating the direction of the solar radiation relative to the traveling direction of the vehicle, a first setting means for setting the rotational speed of the blower, a second setting means responsive to the first setting means for setting the air-distribution ratio control range, and a control means for controlling the regulating member to obtain an air-distribution ratio suitable for the calculated solar radiation direction within the control range. Thus, the air-distribution ratio control range is limited in accordance with the amount of air supplied by the blower, whereby more comfortable air conditioning can be realized.

According to another feature of the present invention, in a vehicular air conditioning system in which an air flow produced by a blower is conditioned and discharged into a passenger compartment, the system comprises a regulating member for regulating the air-distribution ratio, a plurality of solar radiation quantity detectors for detecting the quantities of solar radiation at a plurality of points in the passenger compartment, a calculating means responsive to the solar radiation quantity detectors for calculating the direction of the solar radiation relative to the traveling direction of the vehicle, a first control means responsive to the calculating means for controlling the regulating member to obtain a suitable air-distribution ratio for the calculated direction of the solar radiation when the calculated direction of solar radiation is outside a prescribed range, a detecting means responsive to the calculating means for detecting the current control condition of the air-distribution ratio, and a second control means responsive to the detecting means for controlling the blower in such a way that the correction amount of air discharge in the case where the direction of the solar radiation is not within the prescribed range is less than that in the case where the direction of the solar radiation is within the prescribed range. This arrangement effectively prevents unnecessarily large amount of air discharge.

The invention will be better understood and other objects and advantages thereof will be more apparent from the following detailed description of preferred embodiments with reference to the accompanying drawings.

DESCRIPTION OF PREFERRED EMBODIMENTS

Figure 1:
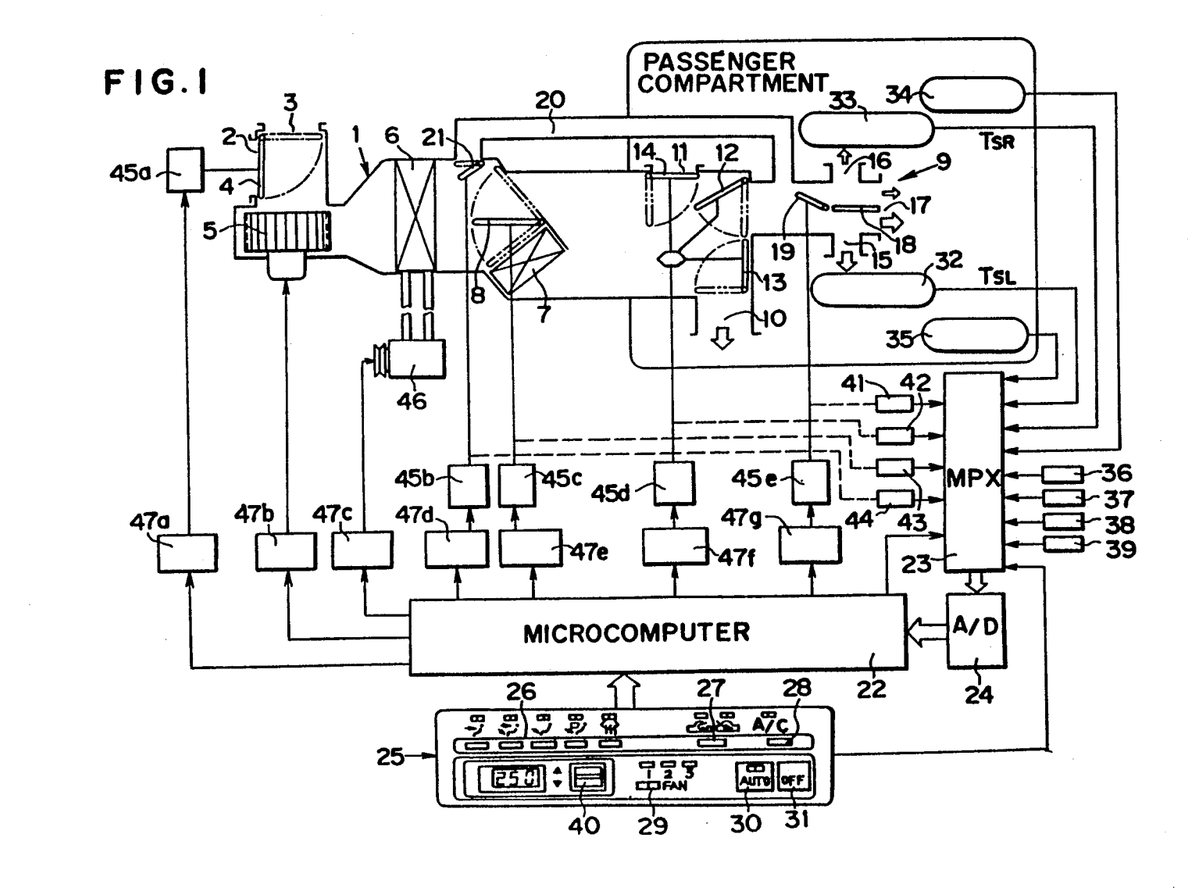
FIG. 1 is a diagrammatic view of an embodiment of an air conditioning system for vehicles according to the present invention.

FIG. 1 diagrammatically shows an air conditioning system for vehicles. The air conditioning system includes an air-flow duct 1 having an outside air intake 3 and a recirculating air intake 2 disposed at an upstream end thereofin a bifurcated fashion. A selecting door 4 is disposed at the junction between the two air intakes 2, 3 and is actuated by an actuator 45a driven by a driving circuit 47a so as to select between an air intake mode in which recirculated air is introduced into the air-flow duct 1 and one in which outside air is introduced thereinto.

A blower 5 driven by a driving circuit 47b is disposed in the air-flow duct 1 adjacent to the air intakes 2, 3 for blowing air through the air-flow duct 1 in the direction of a passenger compartment. The duct 1 also includes an evaporator 6 disposed downstream of the blower 5. The evaporator 6 is connected by piping with a compressor 46 driven by a driving circuit 47c to jointly constitute a well-known refrigeration system or cycle.

A heater core 7 is disposed downstream of the evaporator 6, and an air-mix door (a temperature control damper) 8 is disposed upstream of the heater core 7. The angular position of the air-mix door 8 (i.e. the opening of the air-mix door 8) is regulated by an actuator 45c driven by a driving circuit 47e so that the ratio between the air flowing through the heater core 7 and the air bypassing the heater core 7 is changed to thereby control the temperature of the air discharged from the air conditioning system.

The air-flow duct 1 has at its downstream end a defroster outlet 11, a vent outlet 9 and a lower outlet 10, which are provided in branched fashion and all open into the passenger compartment. Three mode doors, namely, a vent door 12, a foot door 13 and a defroster door 14, are disposed adjacent to the respective outlets 9, 10 and 11. The mode doors 12 to 14 are controlled by an actuator 45d driven by a driving circuit 47f to establish a desired air-discharge mode.

The vent outlet 9 has a left upper air outlet 15 opening to the left side of the passenger compartment, a right upper air outlet 16 opening to the right side of the passenger compartment, and a central upper air outlet 17 opening to the center of the passenger compartment disposed centrally between the right and left upper air outlets 16 and 15. A partition plate 18 is disposed at the junction between these air outlets 15 to 17 in such a way that the opening of the central upper air outlet 17 is divided into two. An air-distribution door 19 is disposed in front of the partition plate 18 and controlled by an actuator 45e driven by a driving circuit 47g to adjust the air-distribution ratio.

The air conditioning system further includes a bypass duct 20 communicated with the air-flow duct 1 in such a way that one end of the bypass duct 20 opens at the portion between the evaporator 6 and the air-mix door 8 and the other end opens at the portion between the vent door 12 and the air-distribution door 19. A bypass door 21 is disposed at one end of the bypass duct 20 and cool air is supplied appropriately to the vent outlet 9 by regulating the position of the bypass door 21 by means of an actuator 45b driven by a driving circuit 47d, whereby fine adjustment of the air discharge in temperature can be carried out.

The system has a microcomputer 22 of well-known design, including a central processing unit (CPU), a read only memory (ROM), a random access memory (RAM), an input/output port (I/O), and the like (none of which are shown). A signal selected by a multiplexer (MPX) 23 is applied to an analog-to-digital (A/D) converter 24 for converting it into a digital form and the obtained digital signal is supplied to the microcomputer 22. The microcomputer 22 also receives various signals from a console panel 25, as described later on. The console panel 25 is equipped with a mode setter 26 for setting air-discharge modes, an intake mode setter 27 for setting the intake mode, an air-compressor (A/C) switch 28 for activating the compressor 46 in the refrigeration cycle, a blower intensity setter 29 for setting the intensity of the blower 5, an AUTO switch 30 for activating automatic air conditioning operation, and an OFF switch 31 for stopping the automatic air conditioning operation. All the switches and setters sent output signals to the microcomputer 22.

The MPX 23 is connected with integral type solar radiation sensors 32 and 33 which are installed on the left and right sides of the upper surface of the vehicle's instrument panel, inside air temperature sensors 34 and 35 installed at upper and lower parts of the passenger compartment for detecting the temperatures of the upper and lower portions of the passenger compartment, an outside air temperature sensor 36 for detecting the temperature of the outside air, a duct sensor 37 for detecting the temperature of the air at the evaporator 6, and a water temperature sensor 38 for detecting the temperature of the engine coolant which supplies heat to the heater core 7, an air-distribution switch 39 for controlling the air-distribution door 19 manually, and a temperature setter 40 disposed on the console panel 25, for setting the target temperature of the inside air. The MPX 23 is further connected with first to fourth position sensors 41 to 44 for supplying MPX 23 with feedback signals indicating the current positions of the air-distribution door 19, the mode doors 12 to 14, the airmix door 8, and the bypass door 21.

The microcomputer 22 executes a control program stored therein for controlling operations of the actuator 45a for actuating selecting door 4, the blower 5, the compressor 46, the actuator 45b for actuating the bypass door 21, the actuator 45c for actuating the air-mix door 8, the actuator 45d for actuating the mode doors 12 to 14, and the actuator 45e for actuating the air-distribution door 19. To achieve the control operations, the microcomputer 22 produces control signals on the basis of the input signals supplied from the A/D converter 24 and the console panel 25, and the control signals are applied to the driving circuits 47a to 47g.

The air-distribution control operation and the air discharge control operation which is carried out in relation to the air-distribution control will now be described with reference to the flowchart shown in FIG. 2.

The microcomputer 22 starts executing the control program from step 100, and the operation moves to step 102 in which the output signals supplied from the A/D converter 24 and the console panel 25 are read in.

After data input in step 102, a solar radiation quantity $T_S$ based on the output signals $T_{SL}$, $T_{SR}$ of the left and right solar radiation sensors 32, 33 is calculated in step 104. The solar radiation quantity calculation of step 104 is conducted in accordance with the subroutine shown in FIG. 3.

Figure 3:
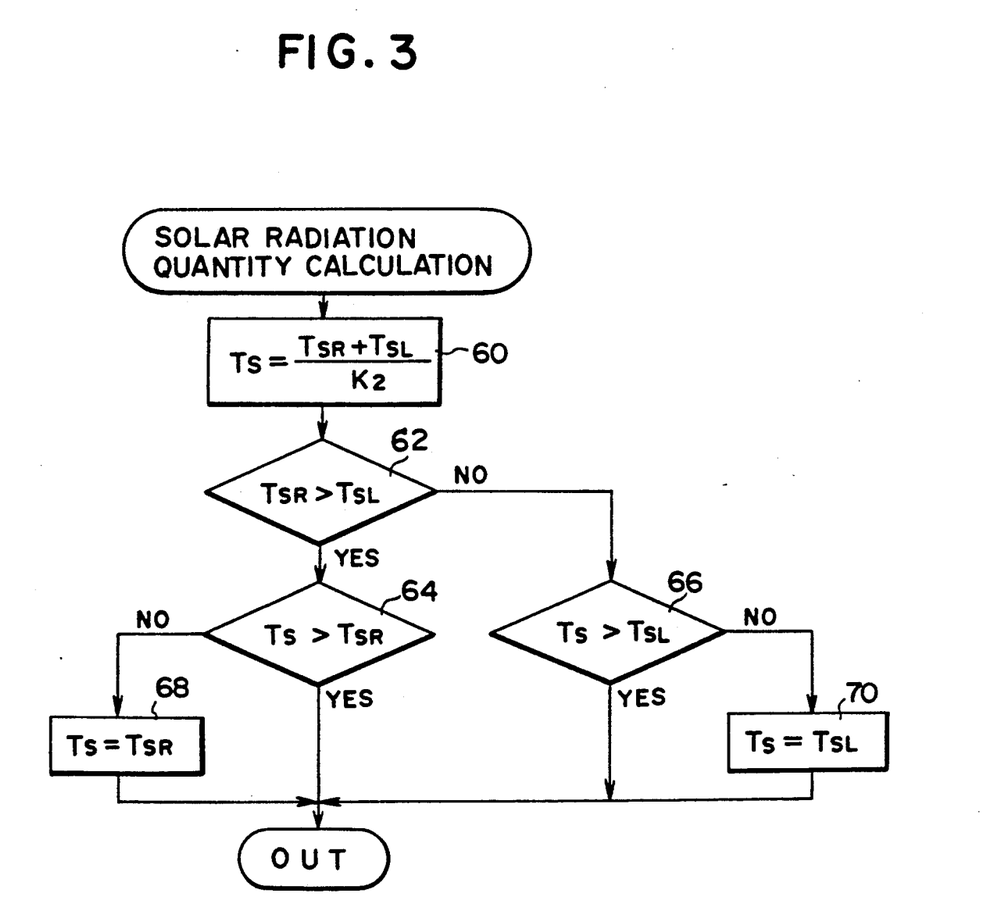
FIG. 3 is a flowchart showing a control subroutine for the calculation of a solar radiation quantity.
Figure 4:
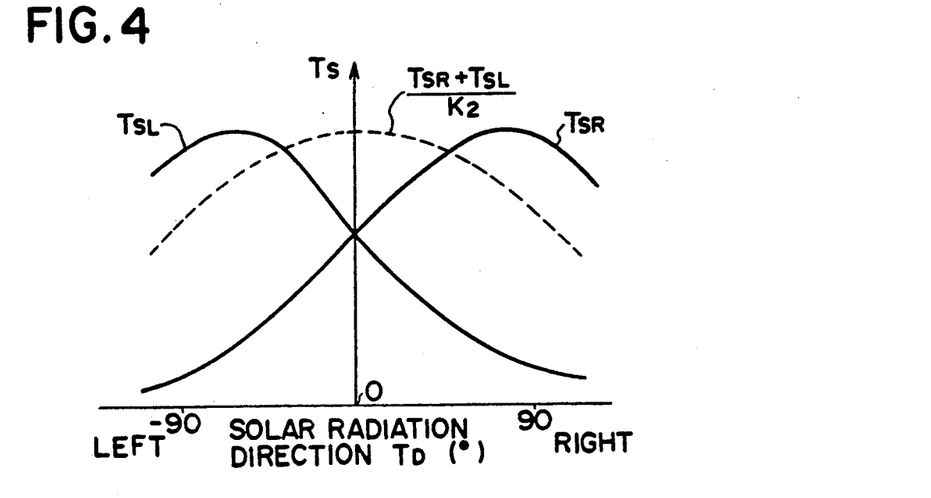
FIG. 4 is a graph explanatory of the calculating operation of the subroutine shown in FIG. 4.

Referring to FIG. 3, an interpolated value $(T_{SR}+T_{SL})/K_2$ as indicated by the dotted line in FIG. 4 is calculated in step 60, based on the output signal $T_{SL}$ from the left solar radiation sensor 32 and the output signal $T_{SR}$ from the right solar radiation sensor 33. The interpolated value is a control value $T_S$. The interpolated value is needed because the respective solar radiation sensors 32 and 33 have different directivities as indicated by the solid lines in FIG. 4 and hence the outputs from the solar radiation sensors 32, 33 have to be compensated in order to obtain a constant output irrespective of the direction of the sun. $K_2$ is a calculation constant determined such that the interpolated value has a peak which is equal to the peaks of the output signals $T_{SL}$ and $T_{SR}$. In the succeeding steps, the control value $T_S$ is replaced by the largest of the three values $T_{SL}$, $(T_{SR}+T_{SL})/K_2$ and $T_{SR}$ (steps 62 to 70).

Returning to FIG. 2, after the calculation of the solar radiation quantity $T_S$ in step 104, the procedure advances to step 106 for calculating the solar radiation direction $T_D$. This calculation is performed in accordance with the subroutine shown in FIG. 5. In this case, the solar radiation direction $T_D$ is represented by the angle of the sun with respect to the traveling direction of the vehicle as illustrated in FIG. 6.

Figure 5:
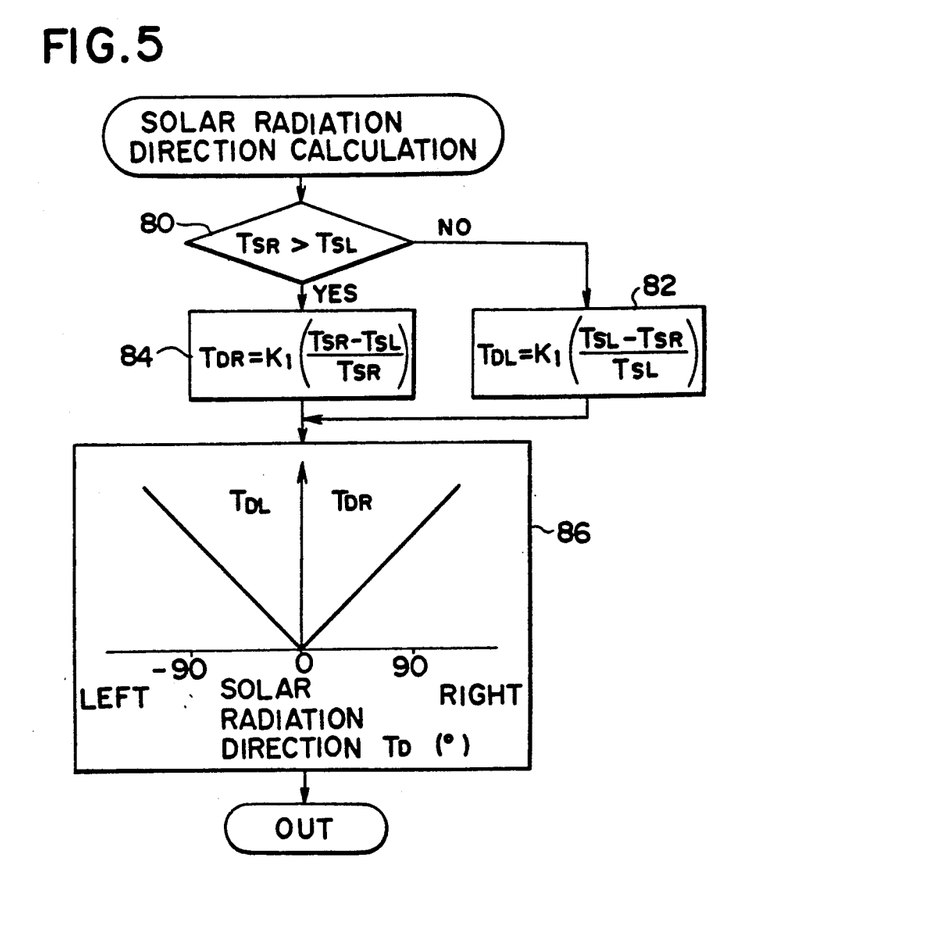
FIG. 5 is a flowchart showing a control subroutine for the calculation of a solar radiation direction.
Figure 6:
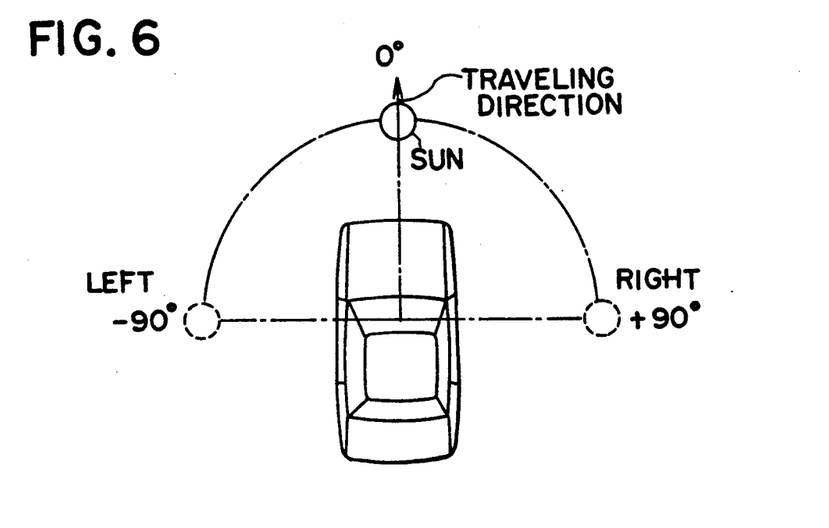
FIG. 6 is a view explanatory of the solar radiation direction with respect to the traveling direction of the vehicle.

Referring to FIG. 5, in step 80 the magnitude of the output signal $T_{SL}$ of the left solar radiation sensor 32 is compared with the output signal $T_{SR}$ of the right solar radiation sensor 33. If $T_{SL}$ is greater than or equal to $T_{SR}$, the procedure goes to step 82 in which a left side coefficient $T_{DL}$ is calculated as $$T_{DL} = K_1 \cdot \frac{T_{SL} - T_{SR}}{T_{SL}} \quad (1)$$

where $K_1$ is a calculation constant.

Conversely, if $T_{SR}$ is greater than $T_{SL}$, the control advances to step 84 to obtain a right side coefficient $T_{DR}$ as $$T_{DR} = K_1 \cdot \frac{T_{SR} - T_{SL}}{T_{SR}} \quad (2)$$

In step 86 the solar radiation direction $T_D$ is determined from the coefficient $T_{DL}$ obtained in step 82 or the coefficient $T_{DR}$ obtained in step 84.

Returning to FIG. 2, after the execution of step 106, the operation moves to step 108, wherein discrimination is made as to whether or not the air-discharge mode is vent mode, that is, whether or not the door 12 is open.

When it is found that the vent outlet 9 is closed, the result in step 108 is NO and the operation moves to step 110, wherein control of the air-distribution door 19 is discontinued. This is because, in general, there is no need to conduct right-to-left air-distribution control when little or no air is not being discharged from the vent outlet 9. With this arrangement, the actuator 45e need be used less often, prolonging its service life, and, moreover, the noise made by driving the air-distribution door 19 is avoided during operation in which no air-distribution control is needed.

On the other hand, the result of the discrimination in step 108 is YES when it is found that the vent mode is selected, and the operation moves to step 112, wherein discrimination is made on the basis of the position of the switch 39 for switching between manual and automatic air-distribution control for determining whether or not the automatic control mode is selected. Alternatively, the discrimination in step 112 can be carried out, for example, on the basis of the temperature of the passenger compartment and the solar radiation quantity. When it is found in step 112 that the switch 39 is set to the manual operation mode, the result of the discrimination in step 112 is NO, and the operation moves to step 110. In this case, a desired air-distribution ratio can be manually set by means of a setting lever (not shown).

On the other hand, if it is found in step 112 that the automatic control mode has been selected, the operation moves to step 114, wherein the range over which air-distribution control is allowed is determined in accordance with the the blower intensity setting.

How the air-distribution control range is set will now be described with reference to FIGS. 7 to 9.

The automatic air-distribution control, which will be described in detail later, is carried out in accordance with the characteristic curve illustrated in FIG. 7. Specifically, when the solar radiation direction $T_D$ is within the range between $-30°$ and $+30°$, the right-to-left air-distribution ratio, namely, the ratio between the amount of air discharge from the outlet(s) to the right of the partition 18 and the amount of air discharge from the outlet(s) to the left thereof, is fixed at 1:1. As the solar radiation direction $T_D$ changes from $-30°$ to $-70°$, the air-distribution to the left side of the passenger compartment increases progressively. When the solar radiation direction $T_D$ exceeds $-70°$, the left-to-right air-distribution ratio is fixed at 5:1 (the lower limit value of $\beta$). Conversely, the air-distribution to the right of the passenger compartment increases progressively as the solar radiation direction $T_D$ changes from $+30°$ to $+70°$. When the solar radiation direction exceeds $+70°$, the left-to-right air-distribution ratio is fixed at 1:5 (the upper limit value of $\alpha$). In the following description, the range of solar radiation directions $T_D$ between $-30°$ to $+30°$ is referred to as the "A zone", and the remaining range of solar radiation directions $T_D$ is referred to as the "B zone", as illustrated in FIG. 7.

Figure 8:
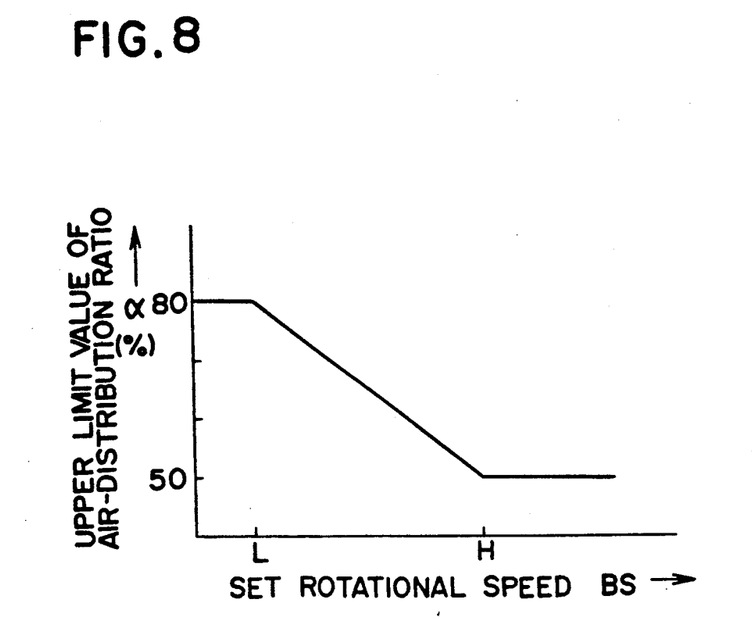
FIG. 8 is a graph showing the relationship between the upper limit value of the air-distribution ratio and the set rotational speed of a blower.
Figure 9:
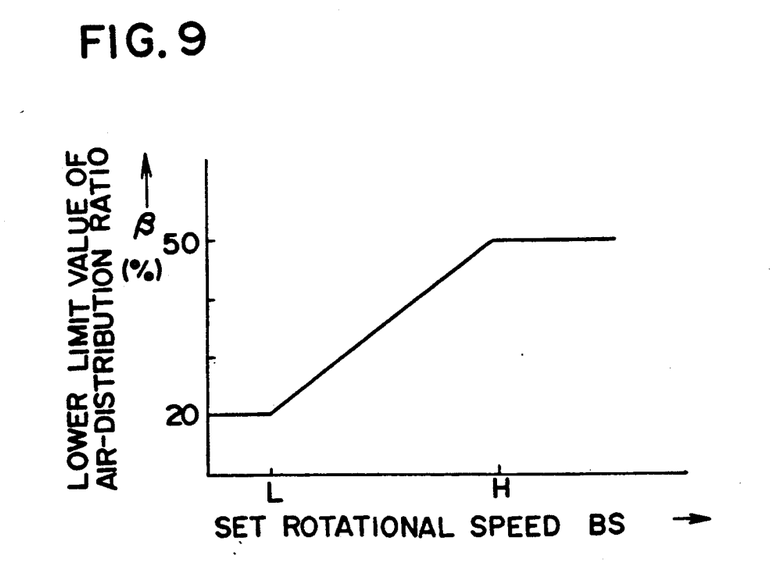
FIG. 9 is a graph showing the relationship between the lower limit value of the air-distribution ratio and the set rotational speed of the blower.

In step 114 the upper and lower limit values $\alpha$ and $\beta$ of the air-distribution ratio are determined in response to the set rotational speed BS of the blower 5 in accordance with the characteristic curves shown in FIGS. 8 and 9, respectively. Thus the range of allowable air-distribution control is set in accordance with the amount of air discharged from the blower 5.

Figure 7:
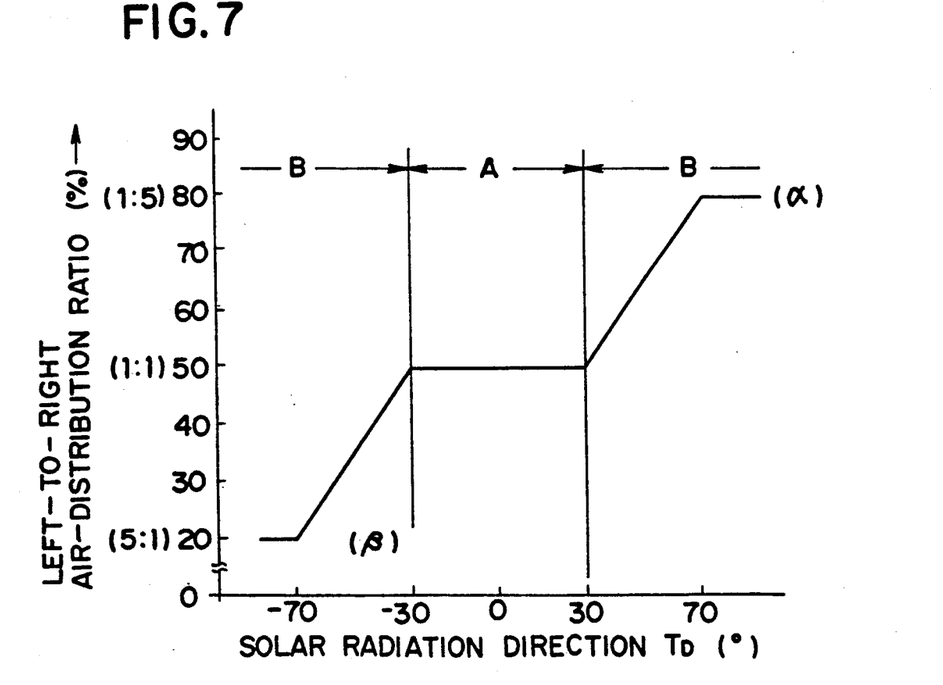
FIG. 7 is a graph showing the relationship between the air-distribution ratio and the solar radiation direction.

In the next step 115, the air-distribution is controlled automatically in accordance with the characteristic curve shown in FIG. 7. The values of $\alpha$ and $\beta$ determined in step 114 are used in step 115. After the execution of step 115, the operation moves to step 116, wherein necessary control other than that of the air-distribution is executed. The operation moves to other routine through step 117. When the result of the discrimination in step 108 or 112 is NO, the operation moves step 110. After the execution of the step 110, the operation moves to step 116, skipping the execution of steps 114 and 115.

Figure 2:
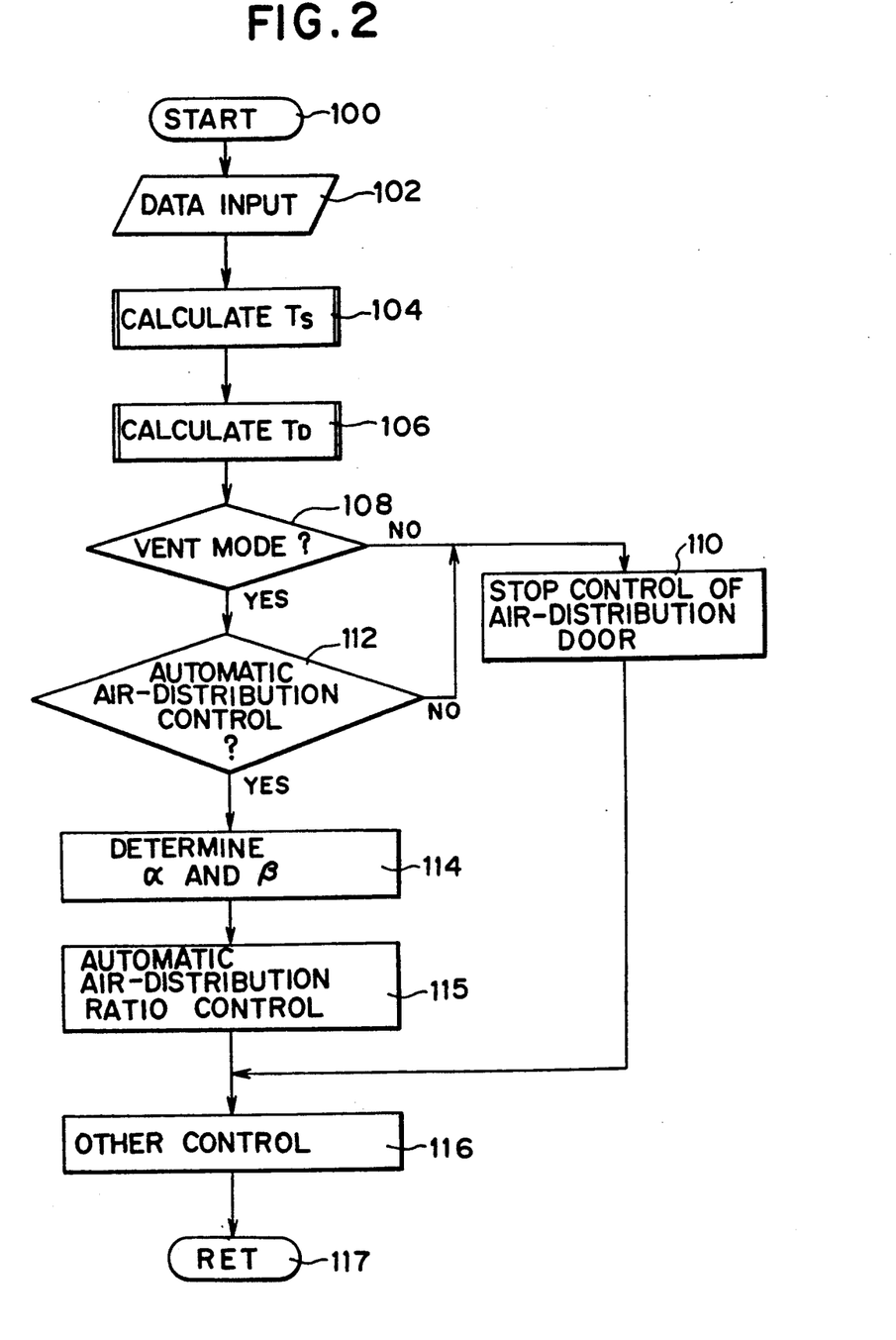
FIG. 2 is a flowchart showing a control program for the control of air-distribution.

According to the control program shown in FIG. 2, since the range of allowable air-distribution control is expanded as the set rotational speed BS of the blower 5 is lowered, the interior of the passenger compartment is uniformly air-conditioned when the amount of air discharge is large, while a large change in the amount of air discharge can be suppressed during the air-distribution control when the amount of air discharged by the blower 5 is small, whereby discomfort to the occupant(s) can be reduced. Thus, it is possible to realize a smooth transition in the amount of air discharge in accordance with the variation of the feeling of the occupant(s), and also to maintain an excellent temperature balance inside the passenger compartment.

Figure 10:
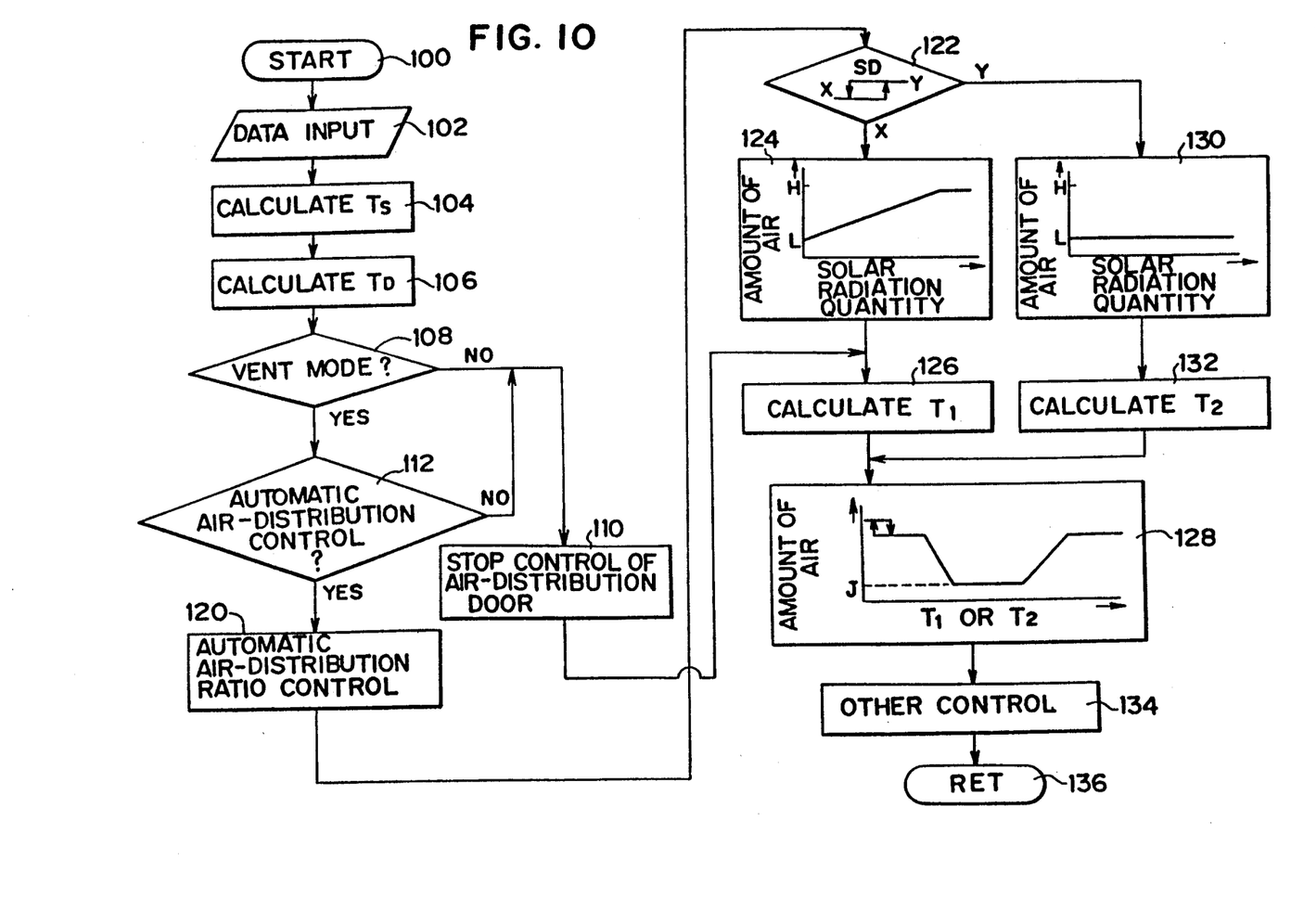
FIG. 10 is a flowchart showing another control program for the control of air-distribution and the control of the amount of air discharge.

FIG. 10 is a flowchart showing another type of control operation, in which the amount of air discharge is controlled on the basis of the air-distribution. Since the operations in steps 100 to 112 are the same as those in the flowchart shown in FIG. 2, they will not be described again here.

When it is found in step 112 that automatic air-distribution control is selected, the operation moves from step 112 to step 120, wherein the air-distribution is automatically controlled on the basis of the solar radiation direction $T_D$ obtained by the calculation in step 106.

Figure 11:
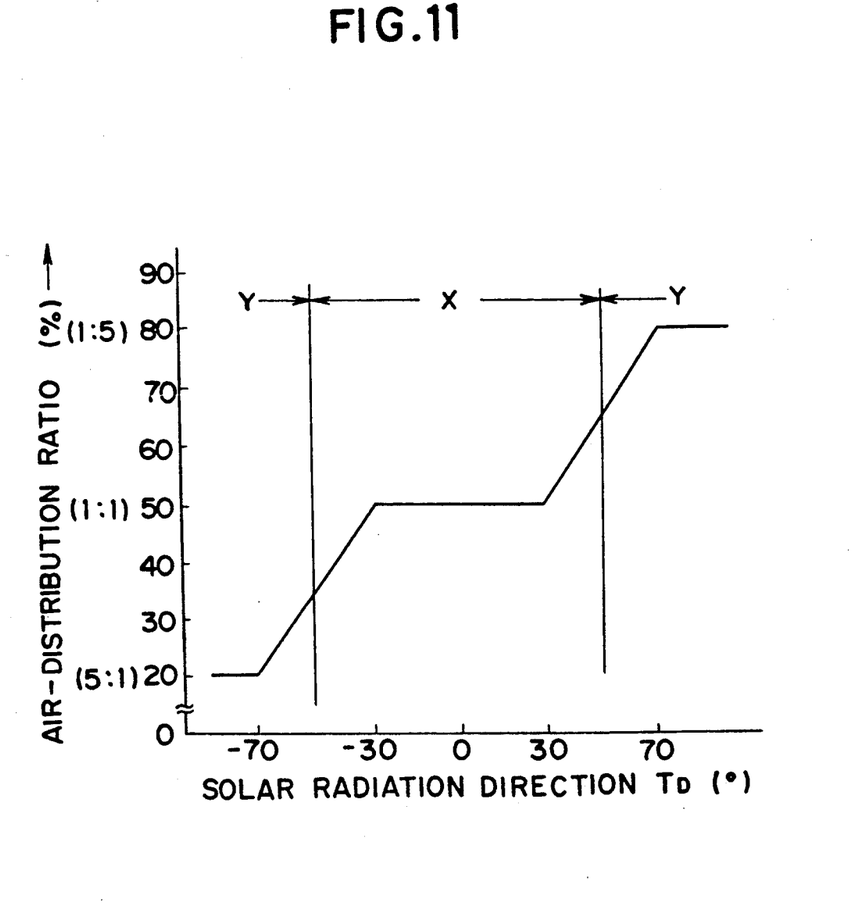
FIG. 11 is a graph showing the relationship between the air-distribution ratio and the solar radiation direction.

The automatic air-distribution control is carried out in step 120 in accordance with the characteristic curve shown in FIG. 11. Specifically, when the solar radiation direction $T_D$ is within the range of $-30°$ and $+30°$, the air-distribution ratio is fixed at 1:1. However, the air-distribution ratio changes linearly in the case when the solar radiation direction $T_D$ changes between $-30°$ and $-70°$, or between $30°$ and $70°$. In the range of the solar radiation direction $T_D$ below $-70°$, the lower limit value of the air-distribution ratio is fixed at 5:1 (20%). In the range of the solar radiation direction $T_D$ exceeding $+70°$, the upper limit value of the air-distribution ratio is fixed at 1:5 (80%). In the following description, the range of solar radiation directions $T_D$ between $-50°$ to $+50°$ will be referred to as the "X zone", and the remaining range of solar radiation directions $T_D$ will be referred to as the "Y zone".

In the next step 122, discrimination is made as to whether the solar radiation direction $T_D$ is within the X zone or within the Y zone. When it is found in step 122 that the solar radiation direction $T_D$ is within the X zone, in which the air-distribution ratio is small enough to avoid a local air conditioning problem, the operation moves to step 124, in which the rotational speed of the lower 5 is controlled so as to increase as the solar radiation quantity increases, whereby the amount of air discharge is corrected. After this, the operation moves to step 126, wherein the target temperature $T_1$ of the discharged air is calculated as $$T_1 = A \cdot T_d - B \cdot T_r - C \cdot T_a - D \cdot T_s + E \quad (3)$$

wherein, A, B, C and D are calculation coefficients, E is a correction value, $T_d$ is the set temperature, $T_r$ is the temperature in the passenger compartment, and $T_a$ is the temperature of the outside air. As will be understood from FIG. 10, the operation moves to step 126 after the execution of step 110 in the case where the determination in either step 108 or 112 is NO.

In the next step 128, the amount of air discharge is determined in the well-known conventional manner on the basis of the value of $T_1$ calculated in step 126 in accordance with the basic characteristic pattern shown by the solid line in the graph in step 128. A lower limit amount J of air discharge in the basic characteristic pattern is set to be equal to the amount of discharge air determined in step 124 in accordance with solar radiation quantity.

On the other hand when it is found in step 122 that the solar radiation direction $T_D$ is within the Y zone, the operation moves to step 130, wherein the lower limit amount J of air discharge is determined in accordance with the solar radiation quantity. In this embodiment, as will be understood from the graph indicated in step 130, the lower limit amount J of air discharge is fixed at a certain constant value irrespective of changes in the solar radiation quantity when the solar radiation direction $T_D$ is within the Y zone. As will be easily understood from a comparison of the characteristic curves of steps 124 and 130, the lower limit J is smaller in the case where the solar radiation direction $T_D$ is within the X zone, wherein the right-to-left air-distribution ratio is within the range of 35% and 65%, than in the case where the solar radiation direction $T_D$ is within the Y zone, wherein the right-to-left air-distribution ratio is not within the aforesaid range.

The operation then moves to step 132, wherein a discharged air target temperature $T_2$ for the Y zone is calculated as $$T_2 = A \cdot T_d - B \cdot T_a - K \cdot T_s + E \quad (4)$$

wherein, K is a calculation constant, which is set to be larger value than the calculation coefficient D of formula (3). Accordingly, the discharged air target temperature $T_2$ for the Y zone is lower than the target temperature $T_1$ for the X zone. The correction amount of air discharge determined in step 128 on the basis of the temperature $T_2$ represented by the formula (4) is smaller than that used in the X zone.

After the execution of step 128, the operation moves to step 134, wherein other control operations are carried out, and the operation advances through step 132 to other routine.

According to the arrangement shown in FIG. 10, the amount of air discharge is controlled in accordance with the air-distribution control, and the correction amount of air discharge determined in the case where the right-to-left air-distribution ratio is within the predetermined range (X zone) is smaller than that determined in the case where the right-to-left air-distribution ratio is not within the predetermined range. Therefore, it is possible to prevent an excessive amount of air from being discharged during the air-distribution control, which enhances the comfort of the occupants. On the other hand, since the amount of correction is increased when the air-distribution control is carried out in the Y zone outside the X zone, an appropriate total amount of air discharge from all of the outlets can be obtained. As a result, better air conditioning can be realized than is possible with the conventional air conditioning system.

What is claimed is:

1. A vehicular air conditioning system in which an air flow produced by a blower is conditioned and discharged into a passenger compartment, said system comprising:

a regulating member for regulating an air-distribution ratio between an amount of air discharged to a right side of the passenger compartment and an amount of air discharged to a left side thereof;

a plurality of solar radiation quantity detectors for detecting quantities of solar radiation at a plurality of points in the passenger compartment;

a calculating means responsive to said solar radiation quantity detectors for calculating a direction of the solar radiation;

a first setting means for setting a rotational speed of the blower;

a second setting means responsive to the first setting means for setting a control range for the air-distribution ratio; and a control means responsive to said calculating means for controlling the regulating member so as to obtain the air-distribution ratio suitable for the calculated direction of the solar radiation within the control range.

2. A system as claimed in claim 1, wherein said plurality of solar radiation quantity detectors is composed of a right side detector for detecting a right side solar radiation quantity striking a right side of the vehicle and a left side detector for detecting a left side solar radiation quantity striking a left side of the vehicle, and the direction of the solar radiation is calculated by subtracting whichever of the left side solar radiation quantity and the right side solar radiation quantity is smaller from the other solar radiation quantity and dividing the difference by the other solar radiation quantity.

3. A system as claimed in claim 1, wherein said control means has a determining means responsive to said calculating means for determining the air-distribution ratio suitable for the calculated direction of the solar radiation in accordance with a characteristic curve indicating a relationship between direction of solar radiation and air-distribution ratio.

4. A system as claimed in claim 3, wherein the air-distribution ratio is not controlled in the case where an angle between a traveling direction of the vehicle and the direction of the solar radiation is in a predetermined range.

5. A system as claimed in claim 4, wherein the air-distribution ratio is changed in accordance with the direction of the solar radiation when the angle is outside of the predetermined range.

6. A system as claimed in claim 1, wherein the lower limit of the control range is set higher as the rotational speed of the blower set by means of said first setting means increases.

7. A system as claimed in claim 1, wherein the upper limit of the control range is set lower as the rotational speed of the blower set by means of said first setting means increases.

8. A vehicular air conditioning system in which an air flow produced by a blower is conditioned and discharged into a passenger compartment, said system comprising:

a regulating member for regulating an air-distribution ratio between an amount of air discharged to a right side of the passenger compartment and an amount of air discharged to a left side thereof;

a plurality of solar radiation quantity detectors for detecting quantities of solar radiation at a plurality of points in the passenger compartment;

a calculating means responsive to said solar radiation quantity detectors for calculating a direction of the solar radiation;

a first control means responsive to said calculating means for controlling the regulating member to obtain the air-distribution ratio suitable for the calculated direction of the solar radiation when the calculated direction of the solar radiation is outside a prescribed range;

a detecting means responsive to the calculating means for detecting the current air-distribution ratio; and a second control means responsive to said detecting means for controlling the blower to obtain a corrected amount of air discharge which is smaller in the case where the direction of the solar radiation is not within the prescribed range than in the case where the direction of the solar radiation is within the prescribed range.

9. A system as claimed in claim 8, wherein said plurality of solar radiation quantity detectors is composed of a right side detector for detecting a right side solar radiation quantity striking a right side of the vehicle and a left side detector for detecting a left side solar radiation quantity striking a left side of the vehicle, and the direction of the solar radiation is calculated by subtracting whichever of the left side solar radiation quantity and the right side solar radiation quantity is smaller from the other solar radiation quantity and dividing the difference by the other solar radiation quantity.

10. A system as claimed in claim 8, wherein said first control means has a determining means responsive to said calculating means for determining the air-distribution ratio suitable for the calculated direction of the solar radiation in accordance with a characteristic curve indicating a relationship between direction of the solar radiation and air-distribution ratio.

11. A system as claimed in claim 9, wherein the air-distribution ratio is changed in accordance with the direction of the solar radiation when the direction of the solar radiation is outside the prescribed range.

12. A system as claimed in claim 8, wherein the minimum corrected amount of air discharge is set to be a constant irrespective of the change in a solar radiation quantity in the case where the direction of the solar radiation is outside of the prescribed range.

13. A system as claimed in claim 8, wherein the minimum corrected amount of air discharge increases as the solar radiation quantity increase in the case where the direction of the solar radiation is within the prescribed range.

* * * * *